(12) United States Patent
Miyabe et al.

(10) Patent No.: US 11,207,645 B2
(45) Date of Patent: Dec. 28, 2021

(54) COMPOSITE SEMIPERMEABLE MEMBRANE AND SPIRAL WOUND SEPARATION MEMBRANE ELEMENT

(71) Applicant: NITTO DENKO CORPORATION, Osaka (JP)

(72) Inventors: Tomotsugu Miyabe, Osaka (JP); Masashi Echizen, Osaka (JP); Kazusa Hitouji, Osaka (JP)

(73) Assignee: NITTO DENKO CORPORATION, Osaka (JP)

( * ) Notice: Subject to any disclaimer, the term of this patent is extended or adjusted under 35 U.S.C. 154(b) by 89 days.

(21) Appl. No.: 16/344,625

(22) PCT Filed: Oct. 25, 2017

(86) PCT No.: PCT/JP2017/038486
§ 371 (c)(1),
(2) Date: Apr. 24, 2019

(87) PCT Pub. No.: WO2018/079589
PCT Pub. Date: May 3, 2018

(65) Prior Publication Data
US 2020/0061548 A1  Feb. 27, 2020

(30) Foreign Application Priority Data

Oct. 28, 2016 (JP) .............................. JP2016-212336

(51) Int. Cl.
| | | |
|---|---|---|
| *B01D 71/56* | (2006.01) | |
| *B01D 61/02* | (2006.01) | |
| *B01D 63/10* | (2006.01) | |
| *B01D 69/12* | (2006.01) | |

(52) U.S. Cl.
CPC .......... *B01D 71/56* (2013.01); *B01D 61/025* (2013.01); *B01D 63/10* (2013.01); *B01D 69/125* (2013.01)

(58) Field of Classification Search
CPC .... B01D 69/125; B01D 61/025; B01D 71/56; B01D 63/10; C08G 69/26
See application file for complete search history.

(56) References Cited

U.S. PATENT DOCUMENTS

| | | | |
|---|---|---|---|
| 6,024,873 A | 2/2000 | Hirose et al. | |
| 6,171,497 B1 | 1/2001 | Hirose et al. | |
| 2003/0183576 A1 | 10/2003 | Ohara et al. | |
| 2008/0257818 A1 | 10/2008 | Konishi et al. | |
| 2013/0256215 A1 | 10/2013 | Nakatsuji et al. | |
| 2016/0279581 A1* | 9/2016 | Echizen ............ | B01D 67/0006 |
| 2017/0007969 A1 | 1/2017 | Nishiyama et al. | |

FOREIGN PATENT DOCUMENTS

| | | |
|---|---|---|
| CN | 1163793 A | 11/1997 |
| CN | 1170627 A | 1/1998 |
| CN | 1631499 A | 6/2005 |
| CN | 1292826 C | 1/2007 |
| CN | 101027116 A | 8/2007 |
| CN | 105705222 A | 6/2016 |
| CN | 105939777 A | 9/2016 |
| JP | 2004-237230 A | 8/2004 |
| JP | 2014-210246 A | 11/2014 |
| KR | 10-2016-0057672 A | 5/2016 |
| WO | WO 2012/090862 A1 | 7/2012 |

OTHER PUBLICATIONS

Written Opinion issued in International Bureau of WIPO Patent Application No. PCT/JP2017/038486, dated Jan. 23, 2018 with English translation.
PCT/IB/338 issued in International Bureau of WIPO Patent Application No. PCT/JP2017/038486, dated May 9, 2019.
Japanese Office Action, Japanese Patent Office, Application No. 2016-212336, dated Jun. 17, 2020, English translation.
Office Action for CN App. No. 201780062005.9, dated Mar. 18, 2021 (w/ translation).
Office Action for CN App. No. 201780062005.9, dated Sep. 27, 2021 (w/ translation).
Office Action for KR App. No. 10-2019-7015042, dated Oct. 12, 2021 (w/ translation).

* cited by examiner

*Primary Examiner* — Vishal V Vasisth
(74) *Attorney, Agent, or Firm* — Greenblum & Bernstein, P.L.C.

(57) ABSTRACT

The purpose of the present invention is to provide: a composite semipermeable membrane which has three excellent properties, namely, excellent ionic substance rejecting property, excellent nonionic substance rejecting property and excellent water permeability in a practically balanced manner, and a spiral wound separation membrane element which comprises this composite semipermeable membrane. A composite semipermeable membrane according to the present invention is obtained by forming a skin layer that contains a polyamide-based resin on a surface of a porous support, and is configured such that: the polyamide-based resin is obtained by polymerizing a polyfunctional acid halide component and a polyfunctional amine component; the polyfunctional amine component contains m-phenylenediamine and at least one diamine compound represented by general formula (1); and a ratio (mol %) of a segment (A) derived from m-phenylenediamine and a segment (B) derived from the diamine compound in the polyamide-based resin is 99.9:0.1 to 98:2 (segment (A):segment (B)).

(1)

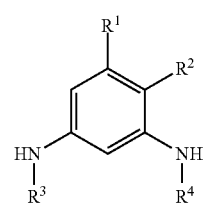

5 Claims, No Drawings

COMPOSITE SEMIPERMEABLE MEMBRANE AND SPIRAL WOUND SEPARATION MEMBRANE ELEMENT

This application is a 371 of PCT/JP2017/038486, filed Oct. 25, 2017.

TECHNICAL FIELD

The present invention relates to a composite semipermeable membrane and a spiral wound separation membrane element. The composite semipermeable membrane and the spiral wound separation membrane element are suitably used for production of ultrapure water, desalination of brackish water or sea water, etc., and usable for removing or collecting pollution sources or effective substances from pollution, which causes environment pollution occurrence, such as dyeing drainage and electrodeposition paint drainage, leading to contribute to closed system for drainage. Furthermore, the membrane can be used for concentration of active ingredients in foodstuffs usage, for an advanced water treatment, such as removal of harmful component in water purification and sewage usage etc. Moreover, the membrane can be used for waste water treatment in oil fields or shale gas fields.

BACKGROUND ART

The composite semipermeable membrane is called an RO (reverse osmosis) membrane, an NF (nanofiltration) membrane, or a FO (forward osmosis) membrane, depending on the filtration performance and treatment method of the membrane, and such membrane can be used for the production of ultrapure water, seawater desalination, desalination of brackish water, waste water recycling treatment, or the like.

As a composite semipermeable membrane used industrially, for example, a composite semipermeable membrane in which a thin layer containing a crosslinked polyamide obtained by polycondensation of a polyfunctional acid halide and a polyfunctional amine component is formed on a supporting film has been proposed (Patent Document 1).

PRIOR ART DOCUMENTS

Patent Documents

Patent Document 1: JP-A-2004-237230

SUMMARY OF THE INVENTION

Problems to be Solved by the Invention

Conventional composite semipermeable membranes have had insufficient water permeability. There has been a trade-off problem such that when water permeability is improved, a rejecting property of ionic substances and/or nonionic substances is deteriorated.

An object of the present invention is to provide a composite semipermeable membrane which has three excellent properties including ionic substance rejecting property, non-ionic substance rejecting property, and water permeability in a well-balanced manner for practical use; and a spiral wound separation membrane element which comprises this composite semipermeable membrane.

Means for Solving the Problem

The inventors of the invention have made extensive studies to solve the above-mentioned problems, and, as a result, have found that the purpose can be achieved by the following composite semipermeable membrane and have completed the invention.

That is, the present invention relates to a composite semipermeable membrane having a skin layer containing a polyamide-based resin on a surface of a porous support, wherein the polyamide-based resin is obtained by polymerizing a polyfunctional acid halide component and a polyfunctional amine component, and the polyfunctional amine component contains m-phenylenediamine and at least one diamine compound represented by general formula (1) below:

[Formula]

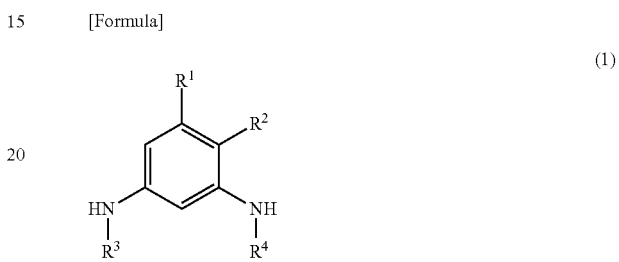

(1)

wherein one of $R^1$ and $R^2$ represents COOH, and the other represents a hydrogen atom; and each of $R^3$ and $R^4$ independently represents a hydrogen atom or an alkyl group having 1 to 4 carbon atoms, and a ratio (mol %) of a segment (A) derived from m-phenylenediamine and a segment (B) derived from the diamine compound in the polyamide-based resin is 99.9:0.1 to 98:2 (segment (A):segment (B)).

Also, the present invention relates to a composite semipermeable membrane having a skin layer containing a polyamide-based resin on a surface of a porous support, wherein the polyamide-based resin is obtained by polymerizing a polyfunctional acid halide component and a polyfunctional amine component, and the polyfunctional amine component contains m-phenylenediamine and at least one diamine compound represented by general formula (2) below:

[Formula]

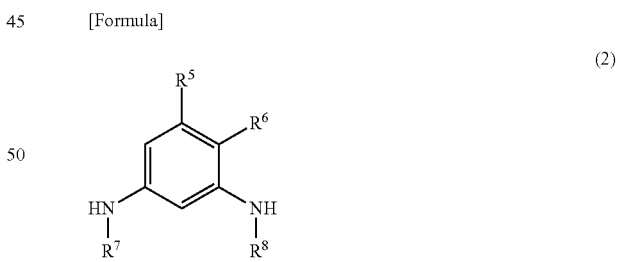

(2)

wherein one of $R^5$ and $R^6$ represents $COOR^9$, and the other represents a hydrogen atom; $R^9$ represents an alkyl group having 1 to 4 carbon atoms, and each of $R^7$ and $R^8$ independently represents a hydrogen atom or an alkyl group having 1 to 4 carbon atoms, and a ratio (mol %) of a segment (A) derived from m-phenylenediamine and a segment (C) derived from the diamine compound in the polyamide-based resin is 97:3 to 83:17 (segment (A):segment (C)).

The inventors of the present invention have found that by forming a skin layer with use of a polyamide-based resin containing a segment (A) derived from m-phenylenediamine and a segment (B) derived from a diamine compound represented by the general formula (1) or a segment (C) derived from a diamine compound represented by the general formula (2) at a specific ratio, a composite semipermeable membrane which has three excellent properties including ionic substance rejecting property, nonionic substance rejecting property, and water permeability in a well-balanced manner for practical use can be obtained. Although the reason why such an effect can be obtained is not clear, it is known that, in general, when a highly reactive monomer is used, the crosslinking density of a skin layer tends to decrease, but the diamine compound represented by the general formula (1) or (2) has low reactivity as compared with m-phenylenediamine and additionally has a hydrophilic substituent. Thus, the reason why such an effect can be obtained is considered to be due to improvement in hydrophilicity of the skin layer without lowering crosslinking density of the skin layer.

When the ratio (mol %) of the segment (B) derived from the diamine compound represented by the general formula (1) is less than 0.1, the water permeability of the composite semipermeable membrane becomes insufficient. The reason for this is considered to be due to a small content of a hydrophilic substituent in the polyamide-based resin. On the other hand, when the ratio (mol %) of the segment (B) exceeds 2, the ionic substance and/or nonionic substance rejecting property of the composite semipermeable membrane decreases. The reason for this is considered to be that although the content of the hydrophilic substituent in the polyamide-based resin increases, a three-dimensional structure of the polyamide-based resin becomes coarse due to steric hindrance of the hydrophilic substituent.

Further, when the ratio (mol %) of the segment (C) derived from the diamine compound represented by the general formula (2) is less than 3, the water permeability of the composite semipermeable membrane becomes insufficient for the same reason as above. On the other hand, when the ratio (mol %) of the segment (C) exceeds 17, the ionic substance and/or nonionic substance rejecting property of the composite semipermeable membrane decreases for the same reason as above.

It is preferable that a total amount of the segment (A) and the segment (B) is 50 mol % or more when an amount of a segment derived from all polyfunctional amine components is 100 mol % in the polyamide-based resin. When the total amount of the segment (A) and the segment (B) is 50 mol % or more, the effect of the present invention is further improved.

It is preferable that a total amount of the segment (A) and the segment (C) is 50 mol % or more when an amount of a segment derived from all the polyfunctional amine components is 100 mol % in the polyamide-based resin. When the total amount of the segment (A) and the segment (C) is 50 mol % or more, the effect of the present invention is further improved.

It is preferable that the total amount of the segment (A) and the segment (B) is 50 to 70 mol % when an amount of a segment derived from all monomer components is 100 mol % in the polyamide-based resin. When the total amount of the segment (A) and the segment (B) is out of the above range, any or all of ionic substance rejecting property, nonionic substance rejecting property, and water permeability tend to decrease.

It is preferable that the total amount of the segment (A) and the segment (C) is 50 to 70 mol % when an amount of a segment derived from all the monomer components is 100 mol % in the polyamide-based resin. When the total amount of the segment (A) and the segment (C) is out of the above range, any or all of ionic substance rejecting property, nonionic substance rejecting property, and water permeability tend to decrease.

The spiral wound separation membrane element of the present invention includes the composite semipermeable membrane as a constituent member thereof.

Effect of the Invention

The composite semipermeable membrane of the present invention has three excellent properties including ionic substance rejecting property, nonionic substance rejecting property, and water permeability in a well-balanced manner for practical use. Use of the composite semipermeable membrane of the present invention makes it possible to efficiently purify high purity water from raw water containing an ionic substance and a nonionic substance.

MODE FOR CARRYING OUT THE INVENTION

The embodiments of the invention will be described below.

In the composite semipermeable membrane of the present invention, a skin layer containing a polyamide-based resin is formed on a surface of a porous support. The skin layer is a layer that acts as a main functional layer in filtration.

The polyamide-based resin is obtained by polymerizing at least a polyfunctional amine component and a polyfunctional acid halide component.

In the present invention, as the polyfunctional amine component, at least m-phenylenediamine and a diamine compound represented by the following general formula (1) are used.

[Formula]

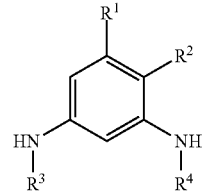

(1)

(In the formula (1), one of $R^1$ and $R^2$ represents COOH, and the other represents a hydrogen atom; and each of $R^3$ and $R^4$ independently represents a hydrogen atom or an alkyl group having 1 to 4 carbon atoms.)

It is preferred that $R^3$ and $R^4$ are each independently hydrogen or a methyl group.

Among the diamine compounds, it is preferable to use at least one member selected from the group consisting of 3,5-diaminobenzoic acid, 2,4-diaminobenzoic acid, N,N'-dimethyl-3,5-diaminobenzoic acid, and N,N'-dimethyl-2,4-diaminobenzoic acid. It is more preferable to use at least one member selected from the group consisting of 3,5-diaminobenzoic acid and 2,4-diaminobenzoic acid.

In the present invention, as the polyfunctional amine component, at least m-phenylenediamine and the diamine compound represented by the following general formula (2) may be used.

[Formula]

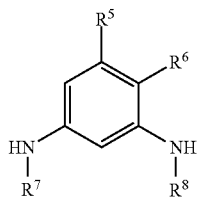

(2)

(In the formula (2), one of $R^5$ and $R^6$ represents $COOR^9$, and the other represents a hydrogen atom; $R^9$ represents an alkyl group having 1 to 4 carbon atoms, and each of $R^7$ and $R^8$ independently represents a hydrogen atom or an alkyl group having 1 to 4 carbon atoms.)

It is preferred that $R^9$ is a methyl group, and that $R^7$ and $R^8$ are each independently hydrogen or a methyl group.

Among the diamine compounds, it is preferable to use at least one member selected from the group consisting of methyl 3,5-diaminobenzoate, methyl 2,4-diaminobenzoate, methyl N,N'-dimethyl-3,5-diaminobenzoate, and methyl N,N'-dimethyl-2,4-diaminobenzoate. It is more preferable to use at least one member selected from the group consisting of methyl 3,5-diaminobenzoate and methyl 2,4-diaminobenzoate.

Further, in the present invention, at least m-phenylenediamine, the diamine compound represented by the general formula (1), and the diamine compound represented by the general formula (2) may be used as the polyfunctional amine component.

An aromatic, aliphatic or alicyclic polyfunctional amine other than m-phenylenediamine and the diamine compound may be used in combination as the polyfunctional amine component.

The aromatic polyfunctional amines include, for example, p-phenylenediamine, o-phenylenediamine, 1,3,5-triamino benzene, 1,2,4-triamino benzene, 2,4-diaminotoluene, 2,6-diaminotoluene, N,N'-dimethyl-m-phenylenediamine, 2,4-diaminoanisole, amidol, xylylene diamine etc.

The aliphatic polyfunctional amines include, for example, ethylenediamine, propylenediamine, tris(2-aminoethyl) amine, n-phenylethylenediamine, etc.

The alicyclic polyfunctional amines include, for example, 1,3-diaminocyclohexane, 1,2-diaminocyclohexane, 1,4-diaminocyclohexane, piperazine, 2,5-dimethylpiperazine, 4-aminomethyl piperazine, etc.

These polyfunctional amines may be used independently, and two or more kinds may be used in combination. In order to obtain a skin layer having a higher salt-rejecting property, it is preferred to use the aromatic polyfunctional amines.

The polyfunctional acid halide component represents polyfunctional acid halides having two or more reactive carbonyl groups.

The polyfunctional acid halides include aromatic, aliphatic, and alicyclic polyfunctional acid halides.

The aromatic polyfunctional acid halides include, for example trimesic acid trichloride, terephthalic acid dichloride, isophthalic acid dichloride, biphenyl dicarboxylic acid dichloride, naphthalene dicarboxylic acid dichloride, benzenetrisulfonic acid trichloride, benzenedisulfonic acid dichloride, chlorosulfonyl benzenedicarboxylic acid dichloride etc.

The aliphatic polyfunctional acid halides include, for example, propanedicarboxylic acid dichloride, butane dicarboxylic acid dichloride, pentanedicarboxylic acid dichloride, propane tricarboxylic acid trichloride, butane tricarboxylic acid trichloride, pentane tricarboxylic acid trichloride, glutaryl halide, adipoyl halide etc.

The alicyclic polyfunctional acid halides include, for example, cyclopropane tricarboxylic acid trichloride, cyclobutanetetracarboxylic acid tetrachloride, cyclopentane tricarboxylic acid trichloride, cyclopentanetetracarboxylic acid tetrachloride, cyclohexanetricarboxylic acid trichloride, tetrahydrofurantetracarboxylic acid tetrachloride, cyclopentanedicarboxylic acid dichloride, cyclobutanedicarboxylic acid dichloride, cyclohexanedicarboxylic acid dichloride, tetrahydrofuran dicarboxylic acid dichloride, etc.

These polyfunctional acid halides may be used independently, and two or more kinds may be used in combination. In order to obtain a skin layer having higher salt-rejecting property, it is preferred to use aromatic polyfunctional acid halides. In addition, it is preferred to form a cross linked structure using polyfunctional acid halides having trivalency or more as at least a part of the polyfunctional acid halide components.

Furthermore, in order to improve performance of the skin layer including the polyamide resin, polymers such as polyvinyl alcohol, polyvinylpyrrolidone, and polyacrylic acids etc., and polyhydric alcohols, such as sorbitol and glycerin, may be copolymerized.

The porous support for supporting the skin layer is not especially limited as long as it has a function for supporting the skin layer, and usually ultrafiltration membrane having micro pores with an average pore size approximately 10 to 500 angstroms may preferably be used. Materials for formation of the porous support include various materials, for example, polyarylether sulfones, such as polysulfones and polyether sulfones; polyimides; polyvinylidene fluorides; etc., and polysulfones and polyarylether sulfones are especially preferably used from a viewpoint of chemical, mechanical, and thermal stability. The thickness of this porous support is usually approximately 25 to 125 μm, and preferably approximately 40 to 75 μm, but the thickness is not necessarily limited to them. The porous support may be reinforced with backing by cloths, nonwoven fabric, etc.

Processes for forming the skin layer including the polyamide resin on the surface of the porous support is not in particular limited, and any publicly known methods may be used. For example, the publicly known methods include an interfacial condensation method, a phase separation method, a thin film application method, etc. The interfacial condensation method is a method, wherein an amine aqueous solution containing a polyfunctional amine component, an organic solution containing a polyfunctional acid halide component are forced to contact together to form a skin layer by an interfacial polymerization, and then the obtained skin layer is laid on a porous support, and a method wherein a skin layer of a polyamide resin is directly formed on a porous support by the above-described interfacial polymerization on a porous support. Details, such as conditions of the interfacial condensation method, are described in Japanese Patent Application Laid-Open No. S58-24303, Japanese Patent Application Laid-Open No. H01-180208, and these known methods are suitably employable.

In the present invention, it is preferred to form a skin layer by an interfacial polymerization method including forming a coating layer of an aqueous solution containing a polyfunctional amine component on a porous support and bringing an organic solution containing a polyfunctional acid halide component into contact with the coating layer of the aqueous solution.

In the interfacial polymerization method, although the concentration of the polyfunctional amine component in the amine aqueous solution is not in particular limited, the concentration is preferably 0.1 to 10% by weight, and more preferably 0.5 to 5% by weight. Less than 0.1% by weight of the concentration of the polyfunctional amine component may easily cause defect such as pinhole in the skin layer, leading to tendency of deterioration of salt-rejecting property. On the other hand, the concentration of the polyfunctional amine component exceeding 10% by weight allows easy permeation of the polyfunctional amine component into the porous support to be an excessively large thickness and to raise the permeation resistance, likely giving deterioration of the permeation flux.

Although water is mainly used as the solvent for the amine aqueous solution, an alcohol is preferably used in combination from the viewpoint that the alcohol makes the diamine compound represented by the general formula (1) or (2) dissolve easily to improve the reactivity of the diamine compound, so that the content of the segment (B) or the segment (C) derived from the diamine compound in the polyamide-based resin is increased. Examples of the alcohol to be used include methanol, ethanol, isopropyl alcohol and the like. These may be used alone, or two or more of them may be used in combination. The alcohol is preferably used in an amount of 0.1 to 50% by weight, more preferably 1 to 10% by weight, in the total solvent.

Although the concentration of the polyfunctional acid halide component in the organic solution is not in particular limited, it is preferably 0.01 to 5% by weight, and more preferably 0.05 to 1% by weight. Less than 0.01% by weight of the concentration of the polyfunctional acid halide component is apt to make the unreacted polyfunctional amine component remain, to cause defect such as pinhole in the skin layer, leading to tendency of deterioration of salt-rejecting property. On the other hand, the concentration exceeding 5% by weight of the polyfunctional acid halide component is apt to make the unreacted polyfunctional acid halide component remain, to be an excessively large thickness and to raise the permeation resistance, likely giving deterioration of the permeation flux.

The organic solvents used for the organic solution is not especially limited as long as they have small solubility to water, and do not cause degradation of the porous support, and dissolve the polyfunctional acid halide component. For example, the solvents include saturated hydrocarbons, such as cyclohexane, heptane, octane, and nonane, halogenated hydrocarbons, such as 1,1,2-trichlorofluoroethane, etc. A saturated hydrocarbon or a naphthenic solvent, which has a boiling point of preferably 300° C. or less, more preferably 200° C. or less, is used as the solvent for the organic solution. The organic solvent may be used singly or as a mixed solvent of two or more kinds thereof.

Various kinds of additives may be added to the amine aqueous solution or the organic solution in order to provide easy film production and to improve performance of the composite semipermeable membrane to be obtained. The additives include, for example, surfactants, such as sodium dodecylbenzenesulfonate, sodium dodecyl sulfate, and sodium lauryl sulfate; basic compounds, such as sodium hydroxide, trisodium phosphate, triethylamine, etc. for removing hydrogen halides formed by polymerization; acylation catalysts; compounds having a solubility parameter of 8 to 14 $(cal/cm^2)^{1/2}$ described in Japanese Patent Application Laid-Open No. H08-224452.

In the present invention, it is preferable that after the amine aqueous solution is in contact with the organic solution, an excessive organic solution on the porous support is removed, and the formed film on the porous support is heated to 20° C. or more to form a skin layer. By heating the formed film, it is possible to improve the reactivity of the diamine compound represented by the general formula (1) or (2) to increase the content of the segment (B) or the segment (C) derived from the diamine compound in the polyamide-based resin. The heating temperature is more preferably 20 to 200° C., even more preferably 100 to 150° C., particularly preferably 130 to 150° C.

The polyamide-based resin used in the present invention, which is a material for forming a skin layer, has a ratio (mol %) of the segment (A) derived from m-phenylenediamine and the segment (B) derived from the diamine compound in the resin of 99.9:0.1 to 98:2 (segment (A):segment (B)), preferably 99.8:0.2 to 98.2:1.8, more preferably 99.75:0.25 to 98.5:1.5, even more preferably 99.7:0.3 to 98.8:1.2, particularly preferably 99.65:0.35 to 98.9:1.1.

The polyamide-based resin used in the present invention, which is a material for forming a skin layer, has a ratio (mol %) of the segment (A) derived from m-phenylenediamine and the segment (C) derived from the diamine compound in the resin of 97:3 to 87:17 (segment (A):segment (C)).

In the polyamide-based resin used in the present invention, the total amount of the segment (A) and the segment (B) is preferably 50 mol % or more, more preferably 70 mol % or more, even more preferably 90 mol % or more, when the amount of the segment derived from all the polyfunctional amine components is 100 mol %.

In the polyamide-based resin used in the present invention, the total amount of the segment (A) and the segment (C) is preferably 50 mol % or more, more preferably 70 mol % or more, even more preferably 90 mol % or more, when the amount of the segment derived from all the polyfunctional amine components is 100 mol %.

In the polyamide-based resin used in the present invention, the total amount of the segment (A) and the segment (B) is preferably 50 to 70 mol %, more preferably from 55 to 65 mol %, even more preferably 56 to 63 mol %, particularly preferably 56 to 60 mol %, when the amount of the segment derived from all the monomer components in the resin is 100 mol %. Examples of segments other than the segment (A) and the segment (B) include segments derived from a polyfunctional amine other than m-phenylenediamine and the diamine compound, and segments derived from a polyfunctional acid halide.

In the polyamide-based resin used in the present invention, the total amount of the segment (A) and the segment (C) is 50 to 70 mol % when the amount of the segment derived from all the monomer components in the resin is 100 mol %. Examples of segments other than the segment (A) and the segment (C) include segments derived from a polyfunctional amine other than m-phenylenediamine and the diamine compound, and segments derived from a polyfunctional acid halide.

The thickness of the skin layer formed on the porous support is not in particular limited, and it is usually approximately 0.05 to 2 μm, and preferably 0.1 to 1 μm.

There is no limitation on the shape of the composite semipermeable membrane of the present invention. That is, the composite semipermeable membrane can take any conceivable membrane shapes, such as a flat membrane or a spiral element. Further, conventionally known various treatments may be applied to the composite semipermeable membrane so as to improve its salt-rejecting property, water permeability, and oxidation resistance.

The spiral wound separation membrane element of the present invention can be produced by a known method using the composite semipermeable membrane.

EXAMPLE

The present invention will, hereinafter, be described with reference to Examples, but the present invention is not limited at all by these Examples.

[Evaluation and Measurement Method]
(Measurement of Permeation Flux, Sodium Chloride Rejecting Rate, and Boron Rejecting Rate)

A prepared flat shape composite semipermeable membrane was cut into a predetermined shape and size and was set in a flat membrane evaluation cell. An aqueous solution containing 3.2% by weight of sodium chloride and 5 ppm of boron (boric acid 29 ppm) and being adjusted to pH 6.5 to 7 using NaOH was brought into contact with the membrane at 25° C. by applying a differential pressure of 5.5 MPa to the feed side and the permeation side of the membrane for 1 hour, and then the sodium chloride rejecting rate, boron rejecting rate, and permeation flux were measured. As for the sodium chloride rejecting rate, an ordinary electric conductivity was measurement, and as for the boron rejecting rate, a concentration was measured by an ICP analyzer. From the measurement results above, calculation was performed according to the following equations.

<Sodium Chloride Rejecting Rate>

Rejecting Rate (%)=(1−(Sodium chloride concentration in membrane-permeation solution/sodium chloride concentration in Supply Solution))×100

<Boron Rejecting Rate>

Rejecting rate (%)=(1−(Boron concentration in membrane-permeation solution/Boron concentration in supply solution))×100

(Measurement of IPA Rejecting Rate)

A prepared flat shape composite semipermeable membrane was cut into a predetermined shape and size and was set in a flat membrane evaluation cell. Then, an aqueous solution of isopropyl alcohol (IPA) with a concentration of 0.15% by weight was permeated through the composite semipermeable membrane for 30 minutes at an operation pressure of 1.5 MPa, a temperature of 25° C. and a pH of 6.5, and then the IPA rejecting rate was measured. As for the IPA rejecting rate, each IPA concentration in the supply solution and the permeation solution was measured by GC analyzer. From the measurement results above, calculation was performed according to the following equation.

<IPA Rejecting Rate>

Rejecting rate (%)=(1−(IPA concentration in membrane-permeation solution/IPA concentration in supply solution))×100

(Measurement of Amount of Each Segment in Polyamide-Based Resin)

A prepared composite semipermeable membrane was immersed in cyclohexanone, and the polyamide-based resin of the skin layer was recovered and collected in a stainless-steel tube. After addition of methanol and alkali thereto, the mixture was heated at 240° C. for 1 hour to decompose the polyamide-based resin. After cooling to room temperature, the decomposed solution was collected and analyzed by $^1$H-NMR measurement (measuring apparatus: BRUKER Biospin, AVANCE III-600, measuring solvent: DMSO-d6, chemical shift standard: 2.50 ppm (heavy DMSO), 64 times integration, chemical shift: metaphenylenediamine (7.56 ppm), 3,5-diaminobenzoic acid (7.75 ppm), methyl 3,5-diaminobenzoate (7.78 ppm), trimesic acid chloride (8.60 ppm), isophthalic acid chloride (8.40 ppm)). The segment amount (mol %) was calculated from the peak derived from each segment component.

Example 1

An amine aqueous solution containing 2.4% by weight of m-phenylenediamine (MPD), 0.9% by weight of 3,5-diaminobenzoic acid (DABA), 0.15% by weight of sodium dodecylsulfate, 2.15% by weight of triethylamine, 0.31% by weight of sodium hydroxide, 6% by weight of camphorsulfonic acid, and 1% by weight of isopropyl alcohol was applied onto a porous polysulfone support, and then an excess amine aqueous solution was removed to form an aqueous coating layer. The content ratio of MPD and DABA in the amine aqueous solution is about 80 mol % MPD and about 20 mol % DABA. Next, a surface of the aqueous coating layer was immersed in an acid chloride solution containing 0.075% by weight of trimesic acid chloride (TMC) and 0.113% by weight of isophthalic acid chloride (IPC) dissolved in a naphthenic solvent (Exxsol D40, manufactured by Exxon Mobil Corporation) for 7 seconds. Thereafter, an excess solution on the surface of the aqueous coating layer was removed, and the coating layer was air-dried for 20 seconds and further kept in a hot air dryer at 140° C. for 3 minutes to form a skin layer containing a polyamide-based resin on the porous polysulfone support, thereby forming a composite semipermeable membrane.

Example 2

A composite semipermeable membrane was prepared in the same manner as in Example 1, except that an amine aqueous solution containing 2.1% by weight of m-phenylenediamine (MPD), 1.3% by weight of 3,5-diaminobenzoic acid (DABA), 0.15% by weight of sodium dodecylsulfate, 2.15% by weight of triethylamine, 0.31% by weight of sodium hydroxide, 6% by weight of camphorsulfonic acid, and 1% by weight of isopropyl alcohol was used. The content ratio of MPD and DABA in the amine aqueous solution is about 70 mol % MPD and about 30 mol % DABA.

Example 3

A composite semipermeable membrane was prepared in the same manner as in Example 1, except that an amine aqueous solution containing 1.5% by weight of m-phenylenediamine (MPD), 2.1% by weight of 3,5-diaminobenzoic acid (DABA), 0.15% by weight of sodium dodecylsulfate, 2.15% by weight of triethylamine, 0.31% by weight of sodium hydroxide, 6% by weight of camphorsulfonic acid, and 1% by weight of isopropyl alcohol was used. The content ratio of MPD and DABA in the amine aqueous solution is about 50 mol % MPD and about 50 mol % DABA.

Example 4

A composite semipermeable membrane was prepared in the same manner as in Example 1, except that an amine aqueous solution containing 2.7% by weight of m-phenylenediamine (MPD), 0.45% by weight of methyl 3,5-diaminobenzoate (DABAME), 0.15% by weight of sodium dodecylsulfate, 2.15% by weight of triethylamine, 0.31% by weight of sodium hydroxide, 6% by weight of camphorsulfonic acid, and 1% by weight of isopropyl alcohol was used. The content ratio of MPD and DABAME in the amine aqueous solution is about 90 mol % MPD and about 10 mol % DABAME.

Comparative Examples 1 and 2

A composite semipermeable membrane was prepared in the same manner as in Example 1 except that the formulation was changed to those as shown in Table 1.

TABLE 1

| | Amine aqueous solution (% by weight) | | | Acid chloride solution (% by weight) | | Amount of each segment in polyamide-based resin (mol %) | | | | |
|---|---|---|---|---|---|---|---|---|---|---|
| | MPD | DABA | DABAME | TMC | IPC | MPD | DABA | DABAME | TMC | IPC |
| Example 1 | 2.4 (80 mol %) | 0.9 (20 mol %) | — | 0.075 | 0.113 | 57.0 | 0.2 | — | 27.2 | 15.6 |
| Example 2 | 2.1 (70 mol %) | 1.3 (30 mol %) | — | 0.075 | 0.113 | 56.3 | 0.6 | — | 27.5 | 15.5 |
| Example 3 | 1.5 (50 mol %) | 2.1 (50 mol %) | — | 0.075 | 0.113 | 56.5 | 0.8 | — | 28.4 | 14.3 |
| Example 4 | 2.7 (90 mol %) | — | 0.45 (10 mol %) | 0.075 | 0.113 | 55.9 | — | 3 | 25 | 16.1 |
| Comparative Example 1 | 3.0 (100 mol %) | — | — | 0.075 | 0.113 | 58.1 | — | — | 25.8 | 16.1 |
| Comparative Example 2 | 0.8 (30 mol %) | 2.6 (70 mol %) | — | 0.075 | 0.113 | 56.1 | 1.2 | — | 28.6 | 14.1 |

| | MPD:DABA or DABAME (mol %) | Permeation flux ($m^3/m^2 \cdot d$) | Rejecting rate (%) | | |
|---|---|---|---|---|---|
| | | | NaCl | B | IPA |
| Example 1 | 99.65:0.35 | 0.88 | 99.72 | 92.36 | 98.20 |
| Example 2 | 98.95:1.05 | 0.90 | 99.74 | 92.38 | 98.23 |
| Example 3 | 98.6:1.4 | 0.90 | 99.75 | 89.90 | 97.10 |
| Example 4 | 94.9:5.1 | 0.87 | 99.70 | 92.30 | 98.20 |
| Comparative Example 1 | — | 0.79 | 99.68 | 92.38 | 98.20 |
| Comparative Example 2 | 97.9:2.1 | 0.86 | 99.04 | 82.06 | 88.50 |

INDUSTRIAL APPLICABILITY

The composite semipermeable membrane and the spiral wound separation membrane element of the present invention are suitably used for production of ultrapure water, desalination of brackish water or sea water, etc., and usable for removing or collecting pollution sources or effective substances from pollution, which causes environment pollution occurrence, such as dyeing drainage and electrodeposition paint drainage, leading to contribute to closed system for drainage. Furthermore, the membrane can be used for concentration of active ingredients in foodstuffs usage, for an advanced water treatment, such as removal of harmful component in water purification and sewage usage etc. Moreover, the membrane can be used for waste water treatment in oil fields or shale gas fields.

The invention claimed is:

1. A composite semipermeable membrane having a skin layer containing a polyamide-based resin on a surface of a porous support,
wherein the polyamide-based resin is obtained by polymerizing a polyfunctional acid halide component and a polyfunctional amine component, and the polyfunctional amine component contains m-phenylenediamine and at least one diamine compound represented by general formula (1) below:

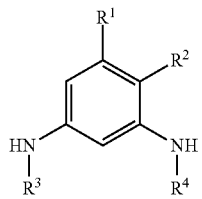

(1)

wherein one of $R^1$ and $R^2$ represents COOH, and the other represents a hydrogen atom; and each of $R^3$ and $R^4$ independently represents a hydrogen atom or an alkyl group having 1 to 4 carbon atoms, and
a ratio (mol %) of a segment (A) derived from m-phenylenediamine and a segment (B) derived from the diamine compound in the polyamide-based resin is 99.75:0.25 to 98.5:1.5 (segment (A):segment (B)) wherein a total amount of the segment (A) and the segment (B) is 50 mol % or more when an amount of a segment derived from all polyfunctional amine components is 100 mol %.

2. The composite semipermeable membrane according to claim 1, wherein the total amount of the segment (A) and the segment (B) is 50 to 70 mol % when an amount of a segment derived from all monomer components is 100 mol % in the polyamide-based resin.

3. A composite semipermeable membrane having a skin layer containing a polyamide-based resin on a surface of a porous support, wherein the polyamide-based resin is obtained by polymerizing a polyfunctional acid halide component and a polyfunctional amine component, and the polyfunctional amine component contains m-phenylenediamine and at least one diamine compound represented by general formula (2) below:

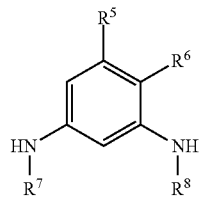

(2)

wherein one of $R^5$ and $R^6$ represents $COOR^9$, and the other represents a hydrogen atom; $R^9$ represents an alkyl group having 1 to 4 carbon atoms, and each of $R^7$ and $R^8$ independently represents a hydrogen atom or an alkyl group having 1 to 4 carbon atoms, and a ratio (mol % of a segment (A) derived from m-phenylenediamine and a segment (C) derived from the diamine compound in the polyamide-based resin is 97:3 to 83:17 (segment (A):segment (C)) wherein a total amount of the segment (A) and the segment (C) is 50 mol % or more when an amount of a segment derived from all polyfunctional amine components is 100 mol %.

4. The composite semipermeable membrane according to claim 3, wherein the total amount of the segment (A) and the segment (C) is 50 to 70 mol % when an amount of a segment derived from all monomer components is 100 mol % in the polyamide-based resin.

5. A spiral wound separation membrane element comprising the composite semipermeable membrane according to claim 1.

* * * * *